July 30, 1929.  V. P. MARRAN  1,722,704
TRACTOR DRIVEN PLOW
Filed Nov. 17, 1927  2 Sheets-Sheet 1
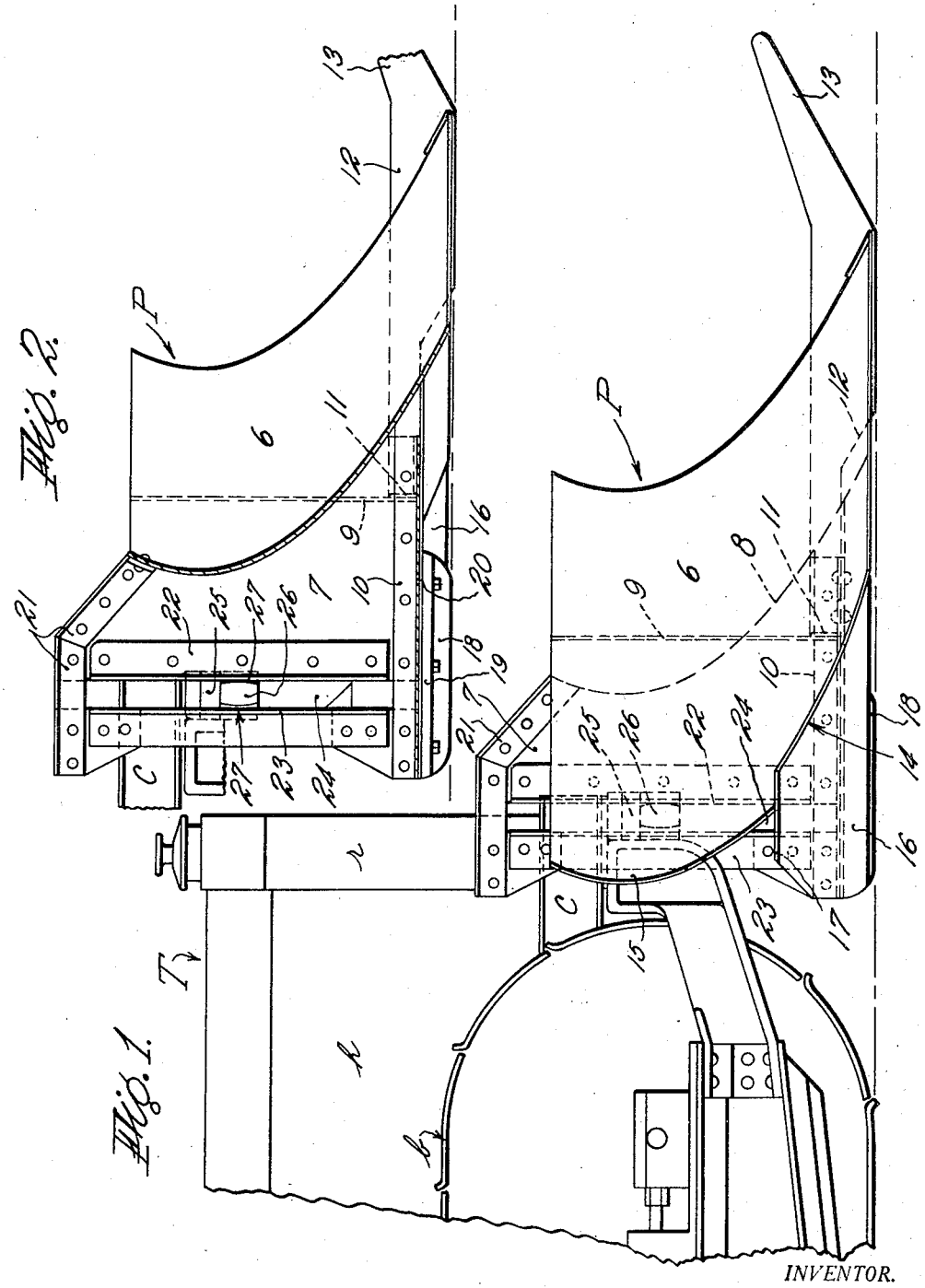
INVENTOR.
Vincent P. Marran
BY Chapin & Neal
ATTORNEYS.

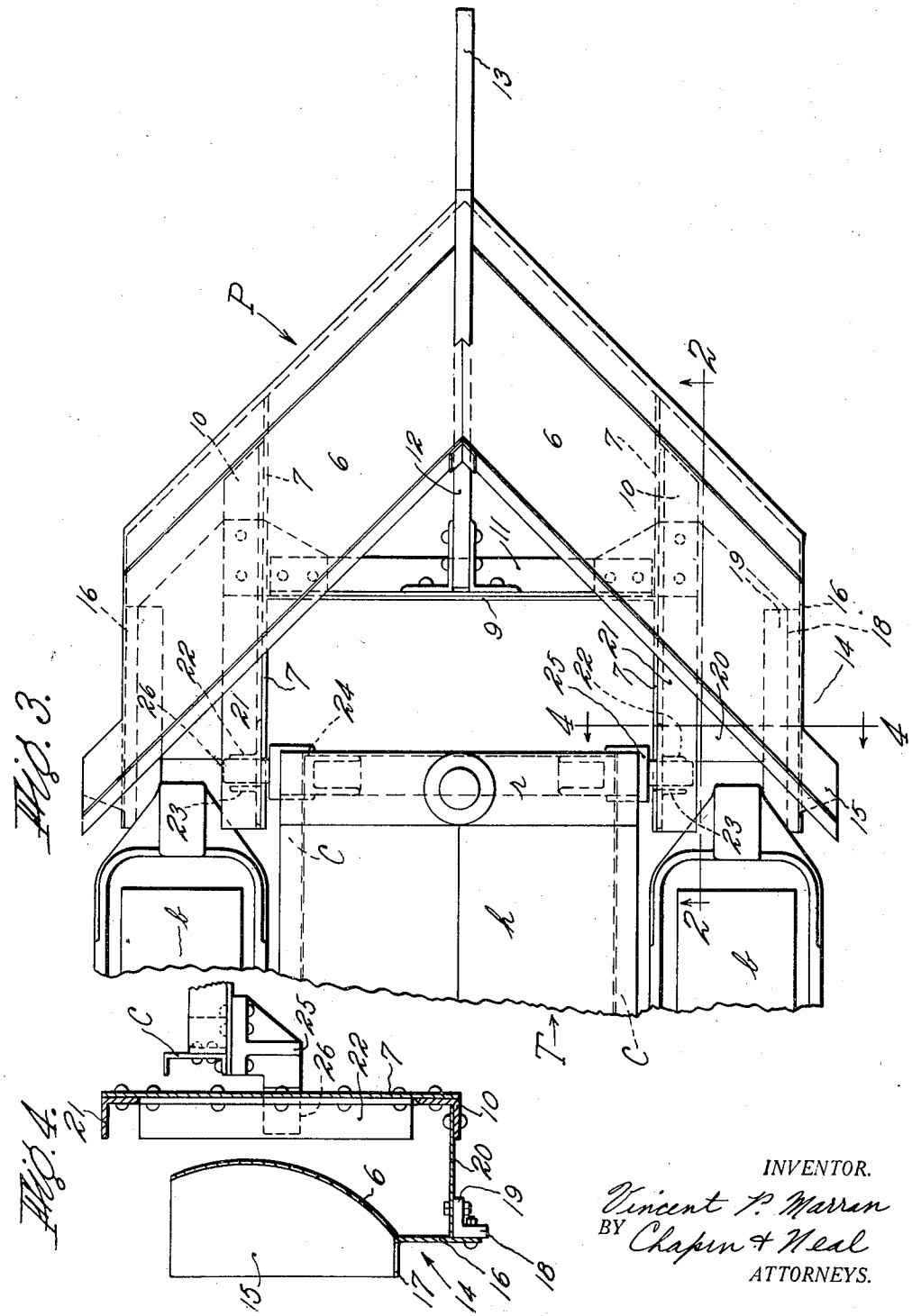

Patented July 30, 1929.

1,722,704

UNITED STATES PATENT OFFICE.

VINCENT P. MARRAN, OF HOLYOKE, MASSACHUSETTS.

TRACTOR-DRIVEN PLOW.

Application filed November 17, 1927. Serial No. 233,963.

This invention relates to an improved driving connection between a tractor and a device, such as a plow, scraper or the like, which is to be pushed by and ahead of the tractor.

In order to permit the plow to follow the irregularities of the road, it must be free to rise and fall relatively to the tractor which is pushing it from behind, and, to this end, a pivotal connection is interposed in the driving connections between the plow and tractor. The best practice, heretofore, is to drive the plow from the rear end of the tractor, as by a pair of push bars fixed to the plow, which bars extend rearwardly of the tractor and are pivotally connected thereto near the rear end thereof. Such construction is used in order to avoid the possibility of a "jackknife" action between the plow and tractor which can occur when the plow is pivotally connected by usual means to the front end of the tractor. For example, if the plow is pivotally connected in the ordinary way to the front end of the tractor and the point of the plow catches on some obstruction, such as a curbstone for example, the rear end of the plow and the front end of the tractor will be thrown upwardly in "jackknife" fashion with results which are often disastrous.

The object of this invention is to provide a connection suitable for use between the plow and the front end of the tractor, which connection will afford the desired freedom for the rise and fall of the plow and yet avoid the "jackknife" action between the connected members.

These, and other objects will more particularly appear from the following description and will be pointed out in the appended claims.

The invention will be disclosed with reference to the accompanying drawings, in which:—

Fig. 1 is a fragmentary side elevational view showing the front end of a tractor with a plow connected thereto by means embodying my invention;

Fig. 2 is a sectional elevational view taken on the line 2—2 of Fig. 3;

Fig. 3 is a fragmentary top plan view of the connected plow and tractor; and

Fig. 4 is a cross sectional view taken on the line 4—4 of Fig. 3.

Referring to these drawings; there is shown in Fig. 1 in fragmentary and more or less conventional form a well known type of tractor, designated generally as T. The fore end only of the tractor is shown, such as the radiator $r$, the hood $h$, endless traction belts $b$, and the two longitudinally disposed channel irons $c$, which form part of the frame of the tractor.

The plow, shown herein as illustrative of a background for the invention, is a snowplow of the V-type, designated generally as P In the form shown, the plow includes two plow walls 6 of suitable curvature, which are disposed in forwardly converging relation with their meeting edges suitably joined together. Two laterally-spaced, parallel and longitudinally-disposed vertical gusset plates 7 are provided and each has its front edge curved, as at 8, to conform to the curvature of its plow wall 6. Such edges abut the walls 6 and are suitably secured thereto as by welding. These gusset plates 7 and the plow walls 6 are interconnected by a transversely-disposed vertical gusset plate 9, suitably connected thereto. Extending along the outer face and near the lower edge of each gusset plate 7 is an angle iron 10, suitably secured thereto, and extending along the front face of the gusset plate 9 near its lower edge is an angle iron 11. Connected at one end to the angle iron 11 is a member 12, which extends forwardly and centrally of the plow and forms a runner therefor. Member 12 extends between the meeting plow walls and forwardly beyond the point of the plow, terminating with an upturned end 13, calculated to enable the plow to ride over substantial obstructions, such as curbstones for example.

The lower part of each wall 6 of the plow is cut away along its rear edge, as shown at 14 in Figs. 1, 3 and 4, making the lower part of the plow of less width than the upper part. In this way, wings 15 are formed which serve to knock off and force back the tops of banks of snow piled up as the result of this or of previous plowings. A vertical gusset plate 16, disposed in parallel relation with the plates 7, is provided along each side of the plow and the outer face of each plate 16 lies in the same plane as the lower side edge of each wall 6. The upper and rear part of plate 16 is outwardly turned, as at 17, at right angles to the body portion and in part underlies wing 15, as shown in Fig. 4, and is suitably secured thereto as by welding, thereby serving to stiffen the wing. The parallel side plates 16 serve to push loose snow into the banks and they also function much like trowels on the lower parts of the snow banks so that these parts are left closely-packed, smooth and hard. To the inner face of each plate 16 is secured an angle shaped bracket, the vertical leg of which constitutes a runner 18. Upon the horizontal leg 19 of this bracket rests one edge of a horizontally disposed plate 20 which is suitably secured thereto and extends across to, and is secured near its opposite edge, to the angle iron 10, above described, as best shown in Fig. 4.

Along the upper edge and on the outer face of each gusset plate 7, an angle iron 21 is secured and this angle iron as well as the lower angle iron 10 is extended beyond the rear vertical edge of the plate, as best shown in Fig. 2. Along the rear edge and secured to the outer face of each gusset 7 is a vertically disposed angle iron 22. Parallel with but rearwardly spaced from the latter is an angle iron 23 which is secured at its upper and lower ends to the angle irons 21 and 10, respectively. These angle irons 22 and 23 afford between them a vertical slot 24, closed at its upper end by the angle iron 21 and at its lower end by the angle iron 10. Secured to the channel frame c of the tractor, one near each front corner thereof, is a bracket 25 (best shown in Fig. 4), which has a transversely-disposed, outwardly projecting part 26 adapted to ride in slot 24. The sides of this part 26 are preferably rounded, as at 27 (Fig. 2), to allow for pivotal movement of the plow relatively to the tractor. The slot 24 in which the part 26 loosely fits, provides for free up and down movement of the plow. Thus, if the plow meets an obstruction and the upturned end 13 guides the plow up and over it, the necessary tilting of the plow relatively to the tractor is permitted by the curved walls 27 or the loose fit of part 26 in slot 24. On the other hand, if the plow meets an obstruction which cannot be coped with by the member 13 and the rear end of the plow is forced to rise, the latter action can take place without throwing the front end of the tractor upwardly, as would occur if the ordinary pivotal connection were used in place of the part 26 and the slot 24.

Each member 25 is broad enough to engage the plate 7 and the adjacent angle iron 23 along the sides of the slot 24. They also engage these plates and angle irons at points above the parts 26. The purpose of this arrangement is to provide buffer blocks, one or the other of which will engage a plate 7 and angle iron 23, when the tractor departs from a straight course of travel, thereby imparting a lateral push to the plow, whereby the latter may be steered.

The invention affords an improved driving connection suitable for connecting tractors to plows or other devices of a generally similar nature. It also affords an improvement in plow construction with respect to the wings 15 and the parallel side plates 16, which serve to trim up the banks along the sides of the plowed road. The details of the plow construction, aside from the features emphasized, are not essential so far as the broader aspects of the invention are concerned, and may be varied as desired. The first feature is likewise independent of whether the plow is of the V-type or otherwise. Also, the two features emphasized may be used independently if desired.

The invention has been disclosed herein, in an embodiment at present preferred, for illustrative purposes but the scope of the invention is defined by the appended claims rather than by the foregoing description.

What I claim is:

1. The combinatin with a plow or the like and a tractor by which the plow is pushed ahead of the tractor, of a pair of longitudinally-disposed members fixed to the plow and laterally-spaced so as to receive between them the front end of the tractor frame, each of said members having a substantially vertical slot, and a device secured to the tractor frame near each front corner thereof to cooperate with the adjacent one of said members as a buffer, whereby the plow may be moved laterally as the tractor is turned, said last named members having parts to ride in said slots, said parts by abutment with a wall of each slot serving as the driving connection between the plow and tractor.

2. The combination with a plow or the like and a tractor by which the plow is pushed ahead of the tractor, of a pair of longitudinally-disposed members fixed to the plow and laterally-spaced so as to receive between them the front end of the tractor frame, each of said members having a substantially vertical slot, and devices secured to the tractor frame, one near each front corner thereof, to cooperate with said members as buffers, whereby the plow may be moved laterally as the tractor is turned, said devices having parts to ride in said slots, said parts by abutment with a wall of each slot serving as the driving connection between the plow and tractor, said parts being approximately rectangular except that their vertical faces are curved thereby to permit pivotal movement of the plow relatively to the tractor.

3. In a snowplow, a plow wall disposed at an acute angle to its path of travel and having a side wall extending from one end of said wall rearwardly and in substantially parallel relation with respect to said path, and a wing on said plow wall extending beyond said end and above said side wall, the upper part of said side wall being outwardly turned and engaging the lower edge of said wing.

In testimony whereof I have affixed my signature.

VINCENT P. MARRAN.